United States Patent

Tani et al.

[11] Patent Number: 5,240,610
[45] Date of Patent: Aug. 31, 1993

[54] FLEXIBLE TUBULAR FILTERING MATERIAL

[75] Inventors: Yatsuhiro Tani; Toshiaki Hayashi, both of Otsu, Japan

[73] Assignee: Toyo Boseki Kabushiki Kaisha, Osaka, Japan

[21] Appl. No.: 613,724
[22] PCT Filed: Mar. 13, 1990
[86] PCT No.: PCT/JP90/00328
§ 371 Date: Nov. 9, 1990
§ 102(e) Date: Nov. 9, 1990
[87] PCT Pub. No.: WO90/10487
PCT Pub. Date: Sep. 20, 1990

[30] Foreign Application Priority Data

Mar. 16, 1989 [JP] Japan .................. 1-65747
Mar. 29, 1989 [JP] Japan .................. 1-79160
Oct. 24, 1989 [JP] Japan .................. 1-278075

[51] Int. Cl.⁵ .............................. B01D 29/00
[52] U.S. Cl. .................... 210/497.1; 55/498; 55/520; 55/527; 55/DIG. 45; 210/356; 210/416.5; 210/493.4; 428/36.3
[58] Field of Search ............ 210/497.1, 494.1, 354, 210/356, 416.5, 457, 493.4; 55/487, 527, 528, DIG. 5, DIG. 43, DIG. 45, 498, 486, 477, 520; 57/905; 87/6, 9, 29; 428/36.3, 377

[56] References Cited

U.S. PATENT DOCUMENTS

| | | | |
|---|---|---|---|
| 2,615,477 | 10/1952 | Crawley | 55/DIG. 45 |
| 3,334,752 | 8/1967 | Matravers | 210/497.1 |
| 3,398,837 | 8/1968 | Adams | 55/520 |
| 3,648,846 | 3/1972 | Sicard | 210/494 |
| 3,670,898 | 6/1972 | Fournier | 210/356 |
| 4,660,779 | 4/1987 | Nemesi et al. | 55/487 |
| 4,761,231 | 8/1988 | Tomita et al. | 210/497.1 |
| 4,861,353 | 8/1989 | Wyss | 55/528 |
| 4,861,633 | 8/1989 | Abe | 57/905 |
| 4,917,714 | 4/1990 | Kinsley, Jr. | 55/528 |

FOREIGN PATENT DOCUMENTS

| | | |
|---|---|---|
| 437988 | 4/1968 | Japan . |
| 52-118332 | 9/1977 | Japan . |
| 57-143295 | 9/1982 | Japan . |
| 63-294911 | 12/1988 | Japan . |

Primary Examiner—Robert A. Dawson
Assistant Examiner—Sun Uk Kim
Attorney, Agent, or Firm—Leydig, Voit & Mayer

[57] ABSTRACT

A flexible tubular filtering material possessing a braided cord structure wherein a number of yarns are intercrossed with each other in the right and the left directions and braided into a cylindrical form, or said material additionally with the fiber assembly layer installed around the cylindrical periphery of the filtering material, which is free of bending obstruction and shows little textural change in the outer and inner peripheries of the curved portion against bend formation, and which possesses high particle removal efficiency and long service life; and a flexible filter element comprising this filtering material in a flexible casing.

They are useful for liquid filters, specifically as a fuel filter for automobiles.

8 Claims, 2 Drawing Sheets

Fig-1

FLEXIBLE TUBULAR FILTERING MATERIAL

DETAILED DESCRIPTION OF THE INVENTION

1. Field of the Invention

The present invention relates to a flexible tubular filtering material with long service life which is capable of removing particles present in fluids, especially those particles present in liquids such as water, oil and fuel, and which is free of bending obstruction, and a flexible filter element wherein said filtering material is housed in a flexible casing.

2. Background of the Invention

Gas filters and liquid filters are used to remove particles present in fluids in a wide variety of fields including the mother machine and automobile industries. With the recent trend to performance sophistication and space saving, there have been increasing demands for improvement in the service life of filter elements used in these filters. Presently, to remove particles present in fluids, especially contaminant particles present in liquids such as water, oil and fuel, so-called sheet filtering materials such as filter paper comprising pulp and nonwoven fabrics comprising synthetic fiber are used. Specifically, the rose filter element is available wherein these sheet filtering materials are formed into a pleat to increase filtering area per element.

In the case of the rose filter element, limitation is posed on the improvement in filtering area per filter element, i.e., in the extension of the service life of the filter element, for example, because a ring cavity is needed at its center, and because increasing the number of ridges causes filtering material overlapping and thus makes the flow path extremely narrow.

It is also impossible to form a filter element into any form other than a cylinder because of the structure of the sheet filtering material used in the filter element.

Accordingly, the purpose of the present invention is to provide a flexible tubular filtering material for removal of particles present in fluids, especially those particles present in liquids, with long service life, which is free of bending obstruction and shows little textural change in the outer and inner peripheries of the curved portion even after the casing, which houses the filter element, is bent to any form.

DISCLOSURE OF THE INVENTION

Taking note of the braided cord, a flexible tube of small diameter permitting an increase in filtering area per filter element, the present inventors made investigations with the aim of obtaining a flexible filtering material which permits an increase in the service life of filter element and which is free of bending obstruction even after the casing which houses the filter element is bent into any form, and developed the present invention.

Accordingly, the flexible tubular filtering material of the present invention is a structure comprising a number of yarns braided into a cylindrical form while being spirally wound in both the right direction for some yarns and left direction for other yarns and also along with the longitudinal direction with the yarns intercrossed with each other.

In the present invention, one or more kinds of yarn constitute the flexible tubular filtering material. When using one kind of yarn, it is a short fiber assembly, e.g., a spun yarn or a multifilament or a 100- to 500-denier monofilament. When using two or more kinds, it is a combination of different yarns, e.g., a combination of spun yarn and filament yarn. Also, either yarn may be a 100- to 500-denier monofilament. In this case, the monofilament serves well to improve the dimensional stability of the flexible tubular filtering material against fluid pressure. If the monofilament is less than 100 denier, some problems arise such as insufficient dimensional stability and a lack of pressure endurance. If it exceeds 500 denier, gaps appear in the interface between different yarns, thus posing a problem of failure to capture particles.

Examples of the starting material for the monofilament for the present invention include polyester, polyolefin, polyamide, polyvinylidene fluoride, polyvinyl chloride, polyvinylidene chloride, polyacrylonitrile, polysulfone, polyphenylene sulfide, polycarbonate and metals.

In the present invention, the number of yarns constituting the flexible tubular filtering material, i.e., the stitch number, depends on the number of spindles of the braiding machine. When using two or more kinds of yarn, the ratio of spindle numbers of the yarns is set at a given level. When using a monofilament as one yarn, it is preferable that the number of spindles to which to attach a monofilament-wound bobbin be less than 70% of the total number of spindles. If all spindles are monofilament-wound bobbins or if more than 70% spindles are monofilament-wound bobbins, no service life increase could be accomplished according to the present invention.

In the present invention, the yarn(s) constituting the flexible tubular filtering material may take the form of a short fiber assembly yarn except for monofilament or a long fiber assembly multifilament. Examples of the starting material fiber therefor include natural fibers such as cotton, wool and silk; semisynthetic fibers such as cellulose and viscose; synthetic fibers such as polyester, polyamide, polyolefin, acryl, polysulfone, polyamidoimide, polyimide, polyphenylene sulfide and polyvinylidene fluoride; and inorganic fibers such as glass, carbon and metals. These fibers may be used singly or in combination.

The single fiber size of these fibers is preferably as small as possible to ensure efficient particle removal from fluid and uniform formation of filtering material pores. This size is normally below 30 denier, preferably below 10 denier, and more preferably below 3 denier. Also, the size of short fiber assembly yarn or long fiber assembly multifilament yarn is normally below 300 denier, preferably below 100 denier, and more preferably below 50 denier. When using the cylindrical tubular filtering material for a role as a support rather than for a filtering effect, a monofilament of 100 to 500 denier is recommended.

In the present invention, the yarn used to extend the service life of the flexible tubular filtering material is preferably a spun yarn or textured yarn having fluff. The doubling size of the yarn(s) incorporated in the flexible tubular filtering material is normally 10 to 1000 denier, preferably 20 to 300 denier, and more preferably 30 to 100 denier.

The number of yarns doubled from the yarn(s) constituting the flexible tubular filtering material of the present invention described above is 1 to 100. In a tubular filtering material prepared by doubling a number of yarns, the above-mentioned number of doubled yarns correlates to the wall thickness of the tubular filtering material, which decreases with the increase in the number of doubled yarns when compared at the same doubled yarn size, and this is effective in the prevention of particles from passing through the filter since the doubled yarns are arranged densely in the peripheral direction and the packing density is uniformized with respect to the two directions. It is more important that even when the flexible tubular filtering material is bent, texture pore shift is not likely to occur, i.e., what is called channelling is not likely to occur, because the packing density is uniform with respect to the two directions and a density gradient exists in the thickness direction.

It is important that the inside diameter of the flexible tubular filtering material of the present invention is 1 to 10 mm, and L/D, the ratio of length to inside diameter, is 10 to 500. If the inside diameter is below 1 mm, the resistance in the tube will increase. If it exceeds 10 mm, the filtering area per unit volume will decrease noticeably. In both cases, a problem of insufficient particle removing performance and service life arises.

When the cross section of the flexible tubular filtering material of the present invention is not circular, equivalent diameter is taken as inside diameter D. Here, the equivalent diameter is calculated from the inside cross sectional area A of the tube and the peripheral length U of the inside wall of the tube using the equation $D = 4A/U$. For example, if we assume an elliptical with a major axis length of a and a minor axis length of b, the equivalent diameter is obtained as $D = 2ab/(a+b)$; if we assume a rectangle with a breadth of B and a height of H, then we obtain $D = 2BH/(B+H)$.

If L/D is 10 or below, the tubular filtering material, when 90°-bent, will show bending obstruction and its filter service life will decrease considerably. On the other hand, if L/D exceeds 500, the particle capturing capacity per unit surface area will decrease with shift from the inlet to outlet of the tubular filtering material, and the service life will no longer be increased even if the amount of filtering material used is increased.

It is desirable that the flexible tubular filtering material of the present invention have a low packing density on the upstream side and a high packing density on the downstream side. If the packing density on the upstream side is high, service life will be short as well as particle removal efficiency will be low because particles are captured on the upstream side alone. The packing density ranges from 0.01 to 0.2 cc/cc on the upstream side and 0.1 to 0.4 cc/cc on the downstream side, and it is preferable that a continuous density gradient be present. Control of these packing densities can be accomplished by providing a packing density gradient by hot melt or thermal shrinkage in the presence of a radial temperature density on the flexible tubular filtering material.

The packing density of a filtering material is expressed with the value (cc/cc) obtained by dividing the fabric weight (g/m$^2$) of the filtering material by the thickness (mm) of the filtering material as measured under a compressive pressure of 10 g per cm$^2$ and then dividing the obtained quotient by the true density (g/cc)$\times 10^3$ of the starting material fiber.

It is desirable that the flexible tubular filtering material of the present invention have fluff or loops thereon or therein. In this case, each filtering material constituting yarn itself may have fluff or loops, or the filtering material itself may be subjected to abrasion or another raising treatment to produce fluff. From this viewpoint, the bulk yarn for the flexible tubular filtering material is preferably a spun yarn or textured yarn. Concerning the shape of fluff, it is 0.3 to 3 mm in the length from the surface of the yarn or filtering material and 5 to 100/cm$^2$ in density. The presence of fluff or loops is conductive to retardation of filtering material clogging since fluff rises in the filtering area and captures particles in liquid stereoscopically in the direction of thickness of the filtering material, thus increasing the service life. The rising treatment of filtering material surface described above is also effective as a means of obtaining a low density on the upstream side and a high density on the downstream side.

It is desirable to use a multiple layer yarn having a core-sheath structure or conjugate structure comprising a high density fiber packing layer and a low density fiber packing layer to constitute the flexible tubular filtering material of the present invention.

In other words, the high density fiber packing layer plays a role to improve the filtering performance, such as particle removal ratio and total particle inflow capacity, of the filtering material of the present invention as well as improve the strength of the filtering material itself and in turn improve the operatability of production of the filtering material, and packing density is an important index of these factors. In the present invention, the packing density of the high density fiber packing layer is normally above 0.6 cc/cc, preferably above 0.7 cc/cc. If the packing density is below 0.6 cc/cc, no satisfactory improvement is always obtained in the strength of the filtering material itself, which means failure to contribute well to improvement in the operatability of filtering material production, and no filtering material with the above-mentioned excellent filtering performance can be obtained. Examples of the material for the high density fiber packing layer include multifilament yarn, textured yarn and spun yarn.

The low density fiber packing layer serves to efficiently remove particles present in fluid, retain them stereoscopically in the direction of thickness of the filtering material and extend the service life. This packing density is normally about 0.05 to 0.5 cc/cc, preferably about 0.1 to 0.3 cc/cc. If the packing density is below 0.05 cc/cc, efficient particle removal from fluid is impossible and the particles could not be retained stereoscopically in the direction of the thickness of the filtering material. Examples of the material for the low density fiber packing layer include spun yarn, crimped textured yarn and short fiber assembly, with preference given to a short fiber assembly.

Figure 2:
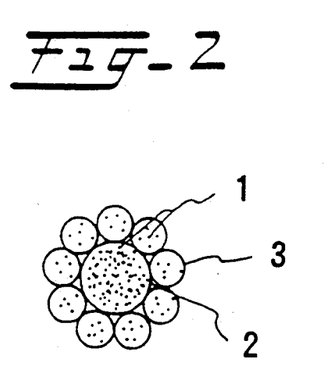
Figure 3:
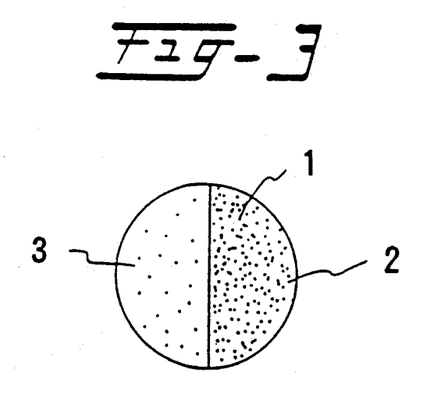

The textured yarn comprising the above-mentioned low and high density fiber packing layers can serve for the desired purpose as long as it has a core-sheath structure or conjugate structure in the longitudinal direction of the yarn in both layers. For example, as illustrated in FIGS. 2 and 3 and described in the following working examples, there are some modes of embodiment, including mode (1) in which a large number of low density fiber packing layers are arranged on the outer periphery of the high density fiber packing layer as they encircle the high density fiber packing layer (FIG. 2), mode (2) in which both types of layers are arranged in contact with each other (FIG. 3), and mode (3) in which the yarn of mode 1 or 2 is spirally twisted in the longitudinal direction of the yarn. Of these modes of embodiment, mode (1) is suitable as a textured yarn for assembling the filtering material of the present invention. Furthermore, it is preferable to combine a textured yarn for the high density fiber packing layer and a short fiber assembly for the low density fiber packing layer.

In the present invention, the fiber assembly layer formed on the periphery of the cylindrically arranged flexible tubular filtering material is configured with one or more of braid, fabric, knit, nonwoven fabric tape, yarn bundle, silver and filament bundle. In this case, the major role of the flexible tubular filtering material is to improve the dimensional stability, pressure endurance and cleaning effect of the multiple layer flexible tubular filtering material, while said fiber assembly layer serves to significantly extend the service life of the multiple layer flexible tubular filtering material of the present invention in comparison with that of the original flexible tubular filtering material.

In the present invention, examples of the starting material fiber for the fiber assembly layer include natural fibers such as cotton, wool and silk; semisynthetic fibers such as cellulose and viscose; synthetic fibers such as polyester, polyamide, polyolefin, acryl, polysulfone, polyamidoimide, polyimide, polyphenylene sulfide, polyvinylidene fluoride and phenol resin; and inorganic fibers such as glass, carbon and metals. These fibers may be used singly or in combination. The single fiber size of these fibers preferably equal or exceed the size of the fiber which contributes to the filtering performance of the flexible tubular filtering material. This is because capturing particles in fluid delays the formation of a particle cake layer, which is the main factor of fluid passage resistance in the flexible tubular filtering material located on the downstream side of the fluid. This is important for the extension of the service life of multiple layer flexible tubular filtering material.

In the present invention, the multiple layer flexible tubular filtering material is formed by winding and fixing a fiber tape, yarn bundle, sliver or filament bundle to constitute the fiber assembly layer around the cylindrical periphery of the previously formed flexible tubular filtering material in the longitudinal direction of the flexible tubular filtering material. Specifically, this can be accomplished by, for example, the method in which a fiber tape is wound while layering in the longitudinal direction, the method in which a filament bundle is wound in the longitudinal direction so that the section of the filament bundle shows a compiled straw bag structure, or the method in which a braided cord is formed on the cylindrical outer periphery of the flexible tubular filtering material.

In the present invention, for the purpose of improving the dimensional stability, pressure endurance and element shapability of the flexible tubular filtering material, one or more monofilaments of 100 to 500 denier may be mixed in the yarn to constitute the filtering material. This increases the rigidity of the filtering material, thus facilitating the winding fixation of the fiber assembly layer, but addition of the monofilament(s) does not reduce the filtering performance of the multiple layer flexible tubular filtering material. The flexible tubular filtering material of the present invention is used to remove particles present in fluid as stated above. It serves well for use as a filter element for a fuel filter for automobiles, for instance.

Figure 1:
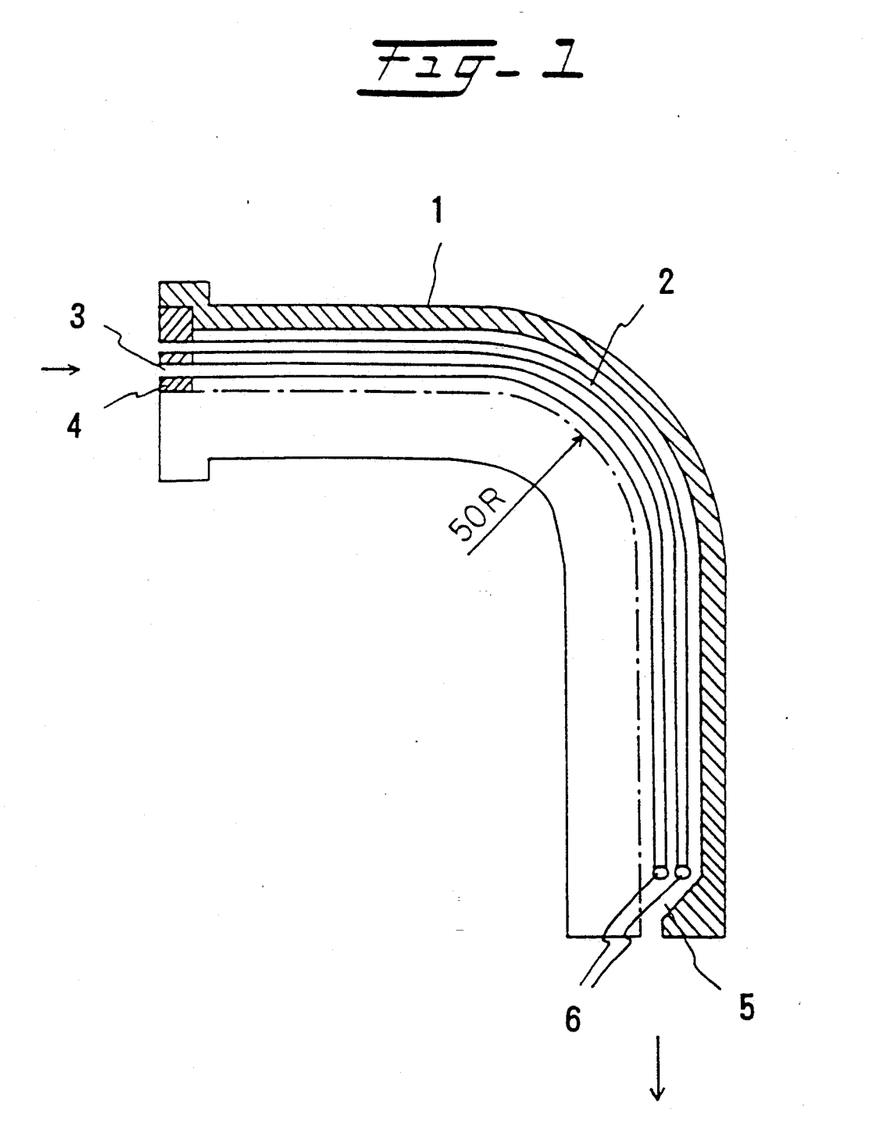

For instance, as illustrated in FIG. 1, when a silicon rubber casing 1 containing two flexible tubular filtering materials is bent with a curvature radius of R = 50 mm, the filtering material 2 easily follows the bending and does not show bending obstruction because it is flexible. The upstream side end of the filtering material 2 is fixed with, for example, epoxy resin 4 at the inlet 3 of the casing, and the downstream side end is sealed with epoxy resin or another material at the outlet 5 of the casing. In the casing 1 with such structure, fuel enters into filtering material 2 via the inlet 3 and the particles in the fuel are removed while the fuel is passing through the tubular wall of the filtering material 2 and then discharged via the outlet 5.

BEST MODE OF EMBODIMENT OF THE INVENTION

The present invention is hereinafter described in more detail by means of the following working examples.

EXAMPLE 1

A 56-denier spun yarn comprising 1-denier polyester staple fiber was braided into a double braid under the doubling conditions shown in Table 1 to yield tubular filtering materials A and B.

TABLE 1

| Parameter | Filtering material | |
|---|---|---|
| | Filtering material A | Filtering material B |
| Number of braided yarns | 4 | 7 |
| Inside diameter (mm) | 2.2 | 1.8 |
| Fabric weight (g/m$^2$) | 120 | 120 |
| L/D | 136 | 167 |

A total of 32 cords of tubular filtering material prepared under the conditions shown in Table 1 were cut into 300-mm pieces, and one opening end was closed with epoxy resin and the other opening end bundled and fixed with adhesive to yield a filter element. From the opening of this filter element, a given concentration of particle suspension prepared by uniformly dispersing the JIS Class 8 test powder having a medium diameter of 6.6 to 8.6 μmas specified in JIS-Z-8901 was fed at a constant flow rate for filtering. Until the pressure loss in the filter element reaches the specified value, the amount of captured particles and the amount of particles which passed through the filter were measured gravimetrically. Based on the values thus obtained, the particle removal ratio and total particle capturing capacity were calculated. Filtering performance measuring conditions:

Particle suspension concentration = 0.5 g/l
Flow rate = 2 l/min.
Specified value of pressure loss = 0.3 kg/cm$^2$ Comparative Example 1

For the purpose of comparison, a rose element of 65 mm in outside diameter, 35 mm in inside diameter and 30 mm in height was prepared by folding with a pleat width of 15 mm a filter paper made of pulp with an average fiber diameter of 20 μm (fabric weight 72 g/m$^2$, thickness 0.25 mm, packing density 0.3 cc/cc).

This filter element underwent the same measuring conditions as in Example 1 to assess its filtering performance.

The results obtained in Example 1 and those obtained in Comparative Example 1 are shown in Table 2.

TABLE 2

| Parameter | Filtering material Example 1 | | Comparative Example 1 |
| --- | --- | --- | --- |
| | Filtering material A | Filtering material B | |
| Particle removal Ratio (%) | 95 | 90 | 83 |
| Total particle capturing capacity (g) | 5.0 | 10.2 | 3.4 |

The filter elements obtained in Example 1, which comprised the tubular filtering material of the present invention, proved to surpass the conventional filter element of pulp filter paper obtained in Comparative Example 1 in both particle removal ratio and total particle capturing capacity.

Comparative Example 2

Filter paper (fabric weight 50 g/m², thickness 0.20 mm, packing density 0.3 cc/cc) comprising pulp with a fiber diameter of 20 μm was bent to a tube with an inside diameter of 2.6 mm and a length of 300 mm (L/D=115). One opening end was closed with epoxy resin, and 32 cords were bundled to yield an element. The filtering performance was assessed under the same conditions as in Example 1. A particle removal ratio of 84% and a total particle capturing capacity of 4.4 g were obtained.

The figures obtained in Comparative Example 2 were lower than those obtained in Example 1.

EXAMPLE 2 AND COMPARATIVE EXAMPLE 3

Filter elements respectively comprising the filtering materials A and B described in Example 1 and the tubular bent filtering material described in Comparative Example 2 were each placed in a tubular casing with a curvature of 90° and assessed as to filtering performance under the same conditions as in Example 1.

TABLE 3

| Parameter | Filtering material | | Comparative Example 1 |
| --- | --- | --- | --- |
| | Filtering material A | Filtering material B | |
| Particle removal Ratio (%) | 94 | 90 | 76 |
| Total particle capturing capacity (g) | 5.1 | 10.2 | 2.2 |

In Comparative Example 3, particle removal ratio and total particle capturing capacity decreased when the filter element was placed in the curved tubular casing, since partial bending occurred in the filter element and the tubular filter paper showed bending obstruction. On the other hand, in Example 2, all results agree with those obtained in Example 1; neither particle removal ratio nor total particle capturing capacity decreased.

EXAMPLE 3 AND COMPARATIVE EXAMPLE 4 AND 5

The spun yarn of Example 1 was braided into a braided cord under the doubling conditions shown in Table 4 to yield a tubular filtering material C.

TABLE 4

| Example 3 | Filtering material C |
| --- | --- |
| Number of braided yarns | 3 |
| Inside diameter (mm) | 1.6 |
| Fabric weight (g/m²) | 150 |

Then, using this tubular filtering material C, 90°-bent filter elements were prepared with the L/D ratio changed to five different levels, and were assessed as to filtering performance under the same conditions as in Example 1. The results are shown in Table 5.

TABLE 5

| Parameter | Filtering material Filtering material | | | | |
| --- | --- | --- | --- | --- | --- |
| | Comparative Example 4 | Example 3 | | | Comparative Example 5 |
| L/D | 5 | 30 | 200 | 400 | 800 |
| Particle removal ratio (%) | 92 | 95 | 96 | 97 | 98 |
| Total particle capturing capacity/L (g/cm) | 0.15 | 0.31 | 0.28 | 0.27 | 0.18 |

When the L/D ratio was 5, the total particle capturing capacity, corresponding to the service life, decreased and the particle removal ratio was low. This is because bending obstruction occurred in the tubular filtering material due to the small curvature radius produced by 90°-bending. The particle removal ratio reduction is attributable to an increase in the rate of passage through the filtering material wall and a pore shift due to significant curving deformation of the tubular filtering material. On the other hand, when L/D was 800, the total particle capturing capacity per unit length of the tubular filtering material decreased; this is because the filtering material area was not efficiently used.

In the range of L/D from 10 to 500 as specified by the present invention, such problems do not occur, and excellent performance is obtained as to particle removal ratio and service life.

EXAMPLE 4

A 60-denier spun yarn comprising 65% of a 0.5-denier polyester staple fiber and 35% of cotton fiber was subjected to the doubling conditions shown in Table 6 to yield braided cords. Then, these were passed through a stainless steel pipe of 3 mm in diameter and 100 mm in length heated to 200° C. to heat treat the outer surface of the braided cords to yield flexible tubular filtering materials A, B and C.

TABLE 6

| Parameter | Filtering material | | |
| --- | --- | --- | --- |
| | Filtering material A | Filtering material B | Filtering material C |
| Number of braided yarns | 2 | 3 | 4 |
| Outside diameter (mm) | 2.5 | 2.4 | 2.3 |
| Fabric weight (g/m²) | 0.8 | 0.8 | 0.8 |
| L/D | 120 | 125 | 130 |

A total of 16 cords of each of the flexible tubular filtering materials prepared under the conditions shown in Table 6 were cut into 600-mm pieces. Both opening ends were bundled and fixed adhesive to yield a filter element. From the opening of this filter element, a given concentration of a particle suspension the prepared by uniformly dispersing the JIS Class 8 test powder specified in JIS-Z-8901 was fed at a constant flow rate for filtering. Until the pressure loss in the filter element reaches the specified value, the amount of captured particles and the amount of particles which passed through the filter were measured gravimetrically. Based on the values thus obtained, the particle removal ratio and total particle capturing capacity were calculated. The results are shown in Table 7.

Filtering Performance Measuring Conditions

Particle suspension concentration = 0.5 g/l
Flow rate = 2 l/min.
Specified value of pressure loss = 0.3 kg/cm$^2$

TABLE 7

| Parameter | Filtering material Example 4 | | |
|---|---|---|---|
| | Filtering material A | Filtering material B | Filtering material C |
| Particle removal ratio (%) | 98 | 97 | 91 |
| Total particle capturing capacity (g) | 6.1 | 7.5 | 8.5 |

The filter elements obtained in Example 4, which comprised the tubular filtering material of the present invention, proved to surpass the conventional filter element of pulp filter paper obtained in Comparative Example 1 in both particle removal rate and total particle capturing capacity.

Comparative Example 6

Filter paper (fabric weight 50 g/m$^2$, thickness 0.20 mm, packing density 0.3 cc/cc) comprising pulp with a fiber diameter of 15 μm was bent to a tube with an inside diameter of 2.6 mm and a length of 300 mm (L/D=115). The filtering performance was assessed under the same conditions as in Example 4. A particle removal ratio of 84% and a total particle capturing capacity of 4.4 g were obtained.

The figures obtained in Comparative Example 6 were lower than those obtained in Example 4.

EXAMPLE 5

Using a 60-denier textured yarn prepared by twisting a combination of 50% of a 0.7-denier polyester staple fiber and 50% of a 1-denier rayon fiber around a 15-denier polyester multifilament, a braided cord was prepared under the conditions shown in Table 8. Then, this braided cord was thermally treated with 240° C. hot blow on the outer surface alone to yield flexible tubular filtering materials D, E and F.

The heat treated flexible tubular filtering materials D, E and F all showed partial hot melt adhesion of outer surface fibers with each other, with one-third of the total thickness of the filtering material having a packing density of 0.3 cc/cc and the remaining two-thirds having a packing density of 0.15 cc/cc.

TABLE 8

| Parameter | Filtering material | | |
|---|---|---|---|
| | Filtering material D | Filtering material E | Filtering material F |
| Number of braided yarns | 2 | 4 | 6 |
| Outside diameter (mm) | 1.4 | 1.5 | 1.6 |
| Fabric weight (g/m$^2$) | 0.6 | 0.6 | 0.6 |

TABLE 8-continued

| Parameter | Filtering material | | |
|---|---|---|---|
| | Filtering material D | Filtering material E | Filtering material F |
| L/D | 214 | 200 | 188 |

The tubular bent filter elements described in Comparative Example 4 and the filtering materials D, E and F obtained in Example 5 were each placed in a tubular casing with a curvature of 90° and rated as to filtering performance under the same conditions as in Example 4. The results are shown in Table 9.

TABLE 9

| Parameter | Filtering Material | | | |
|---|---|---|---|---|
| | Example 5 | | | |
| | Filtering material D | Filtering material E | Filtering material F | Comparative Example 6 |
| Particle removal ratio (%) | 96 | 95 | 93 | 76 |
| Total particle capturing capacity (g) | 8.6 | 9.0 | 11.1 | 2.2 |

In Comparative Example 6, particle removal ratio and total particle capturing capacity decreased, since the tubular filter paper showed bending obstruction due to partial bending in the filter element when the filter element was placed in the curved tubular casing. On the other hand, all the filtering materials obtained in Example 5 had a higher particle removal ratio and the total particle capturing capacity than in Comparative Example 6.

EXAMPLE 6

A textured yarn having a surface fiber packing density of 0.2 cc/cc with a core-sheath structure (FIG. 2, mode 1), wherein the high density fiber packing layer comprises polyester filament yarn (50 denier/25 yarns) and the low density fiber packing layer comprises cotton (39 denier), was braided into a cord under the conditions shown in Table 10 to yield a flexible tubular filtering material.

TABLE 10

| | Example 6 |
|---|---|
| Number of braided yarns | 1 |
| Inside diameter (mm) | 1.4 |
| Thickness (mm) | 0.3 |
| Fabric weight (g/m$^2$) | 0.62 |
| L/D | 214 |

A total of 50 cords of the flexible tubular filtering material prepared under the conditions shown in Table 10 were cut into 300-mm pieces, and the downstream side opening end of the tubular filtering material was closed with epoxy resin and the upstream side end bundled and fixed with epoxy resin to yield a filter element. This filter element was placed in a stainless steel casing of 30 mm in inside diameter. From the opening of this filter element, a given concentration of a particle suspension prepared by uniformly dispersing the JIS Class 8 test powder specified in JIS-Z-8901 was fed at a constant flow rate for filtering. Until the pressure loss in the filter element reaches the specified value, the amount of captured particles and the amount of particles which passed through the filter were measured gravimetrically. Based on the values thus obtained, the particle removal ratio and total particle capturing capacity, an index of the service life of filter element, were calculated. The results are shown in Table 12. Table 12 also gives data on the degree of flexibility of the tubular filtering material.

Filtering Performance Measuring Conditions

Particle suspension concentration = 0.5 g/l
Flow rate = 2 l/min.
Specified value of pressure loss = 0.3 kg/cm$^2$

EXAMPLE 7

The flexible tubular filtering material described in Example 6 was heat treated while it was elongated with a load exerted thereon. Using the filtering material thus obtained, a flexible tubular filtering material was prepared under the conditions shown in Table 11. A total of 70 cords of the flexible tubular filtering material were cut into 300-mm pieces, and treated in the same manner as in Example 6 to yield a filter element. This filter element was placed in a casing, and its filtering performance was assessed. The results are shown in Table 12. Table 12 also gives data on the degree of flexibility of the tubular filtering material.

Heat Treatment Conditions

Load = 0.5 kg
Temperature = 130° C.
Time = 5 minutes

TABLE 11

|  | Example 7 |
| --- | --- |
| Number of braided yarns | 1 |
| Inside diameter (mm) | 1.1 |
| Thickness (mm) | 0.3 |
| Fabric weight (g/m$^2$) | 0.55 |
| L/D | 272 |

Comparative Example 7

Filter paper (fabric weight 50 g/m$^2$, thickness 0.20 mm, packing density 1.3 cc/cc) comprising pulp with an average fiber diameter of 20 μm was bent to a tube with an inside diameter of 1.2 mm and a length of 300 mm (L/D = 231). One opening end of the tubular filter paper was closed with epoxy resin, and 70 cords were bundled to yield a filter element. The filtering performance was assessed under the same conditions as in Example 6 described above. The results are shown in Table 12.

TABLE 12

|  | Particle removal ratio (%) | Total particle capturing capacity (g) | Degree of flexibility (mm) (Note |
| --- | --- | --- | --- |
| Example 6 | 91 | 6.1 | 10 |
| Example 7 | 94 | 8.2 | 10 |
| Comparative Example 7 | 87 | 3.6 | not less than 200 |

(Note: Expressed by maximum possible curvature radius.)

As is evident from the results shown in Table 12, the filter elements comprising the flexible tubular filtering material of the present invention obtained in Examples 6 and 7 are superior to the conventional filter element comprising pulp filter paper obtained in Comparative Example 7 in particle removal ratio, total particle capturing capacity and flexibility. Particularly, when heat treatment was performed under the elongated state described in Example 7, the gaps between the yarns constituting the flexible tubular filtering material become small and the ratio of the fluid which flows in the minute gaps between fibers in the low density fiber packing layer of the textured yarn increased, and thus the filtering performance was enhanced.

EXAMPLE 8 AND COMPARATIVE EXAMPLE 8

The filter elements prepared respectively using the flexible tubular filtering material described in Example 6 and the tubular bent filtering material described in Comparative Example 5 were each placed in a Teflon casing of 30 mm in inside diameter. Then, the casing was bent at an angle of 90° with a curvature radius of 50 mm as illustrated in FIG. 3, and the filtering performance was assessed under the same conditions as in Example 6. The results are shown in Table 13.

TABLE 13

|  | Example 8 | Comparative Example 8 |
| --- | --- | --- |
| Particle removal Ratio (%) | 91 | 79 |
| Total particle capturing capacity (g) | 5.9 | 2.4 |

As seen in Table 13, in Comparative Example 8, the particle removal ratio and total particle capturing capacity decreased due to bending obstruction because the tubular filter paper could not follow the bending of the casing which incorporated the filter element. On the other hand, in Example 8, when the casing which incorporated the filtering material was bent, the flexible tubular filtering material well followed the bending and did not show bending obstruction; thus neither particle removal ratio nor total particle capturing capacity decreased in comparison with the results obtained in Example 6.

EXAMPLE 9

Using a 48-stitch braiding machine, a cylindrical braided structure was prepared with 8 spindles of each of a 250-denier polyester monofilament and a crimped yarn comprising a polyester multifilament having a single yarn size of 0.3 denier (total denier 210) clockwise arranged, 8 spindles of a 250-denier polyester monofilament counterclockwise arranged and 4 cotton yarns added as warps to prevent longitudinal stretching. The fabric weight of the crimped yarn was 40 g/m$^2$. Then, around the circular surface of this cylindrical braided structure was evenly wound a crimped yarn comprising a polyester multifilament of 0.5 denier in single yarn size (total denier 1400) at a winding tension of 1.5 g to yield a multiple layer flexible tubular filtering material of 4.0 mm in inside diameter wherein the fabric weight of the fiber assembly layer was 100 g/m$^2$.

A total of 7 cords of the multiple layer flexible tubular filtering material thus obtained were cut into 300 mm pieces (L/D = 75). One opening end was closed with epoxy resin, and the other end bundled and fixed with epoxy resin adhesive to yield a filter, which was then inserted into a silicon rubber casing of 18 mm in a diameter to yield a filter element.

Then, this filter element was subjected to a light oil filtering test in accordance with the testing method specified in JIS-D-1617 to determine the degree of cleanliness and service life.

For the purpose of comparison, the filter element of Comparative Example 9 was subjected to a filtering test under the same conditions as in Example 7. The results obtained in Example 9 and Comparative Example 9 are shown in Table 14.

TABLE 14

|  | Example 9 | Comparative Example 9 |
| --- | --- | --- |
| Degree of cleanliness (mg/l) | 78 | 105 |
| Service life (minutes) | 27 | 21 |

The filter element obtained in Example 9, which comprised the tubular filtering material of the present invention, proved to be superior to the conventional filter element comprising pulp filter paper obtained in Comparative Example 9 in both the degree of the cleanliness and service life.

The filter element of Example 9 was bent at 90° and subjected to the same filtering test as above. A degree of cleanliness of 75 mg/l and a service life of 26 minutes were obtained, which are not significantly different from the results obtained in the filtering test before bending. This finding demonstrates that the filter element of Example 9 serves well as a flexible filter element.

EXAMPLE 10

A polyester multifilament of 1 denier in single yarn size was subjected to Taslan treatment to yield a 100-denier Taslan yarn. A total of 6 pieces of this yarn were combined. The resulting cord was wound on the outer periphery of the cylindrical braided structure prepared using a 48-stitch braiding machine in Example 9 to yield a fiber assembly layer. The fabric weight of the obtained fiber assembly layer was 210 g/m$^2$ and the inside diameter of the multiple layer flexible tubular filtering material was 4.0 mm.

Then, this multiple layer flexible tubular filtering material was formed into a filter element (L/D=75) in the same manner as in Example 9 and subjected to a filtering test. A degree of cleanliness of 83 mg/l and a service life of 23 minutes were obtained.

EXAMPLE 11

Using a 64-stitch braiding machine, an eliptically cylindrical braided structure having a longitudinally spiral twist was prepared with 16 spindles of each of a 200-denier polypropylene-polyethylene composite monofilament and a crimped yarn comprising a polyester multifilament having a single yarn size of 0.5 denier (total denier 180) clockwise arranged, 16 spindles of a 200 denier polypropylene polyethylene composite monofilament counterclockwise arranged and 4 cotton yarns added as warps to prevent longitudinal stretching, while rotating a needle having an eliptic section located on the braiding point, followed by heat treatment at 135° C., equivalent to the melting point of polyethylene.

Then, on the peripheral surface of this braided structure were evenly wound at a winding tension of 1 g a crimped yarn comprising a 0.5-denier polyester multifilament (total denier 700) for the first layer and another crimped yarn comprising a 1-denier polyester multifilament (total denier 700) for the second layer to yield two fiber assembly layers. The fabric weight of the fiber assembly layers was 50 g/m$^2$ for the first layer and 65 g/m$^2$ for the second layer, and the equivalent diameter of the multiple layer flexible tubular filtering material was 7 mm.

This multiple layer flexible tubular filtering material was cut into 300 mm pieces. After one opening end was closed, two cords were inserted into a silicon rubber casing of 20 mm in inside diameter and the periphery of the opening was fixed with silicon resin adhesive to yield a filter element (L/D=43), followed by the same filtering test as in Example 9 to determine the degree of cleanliness and service life. A degree of cleanliness of 81 mg/l and a service life of 30 minutes were obtained. No filtering performance reduction occurred even in the filtering test conducted with the filter element bent at an angle of 120°.

EXAMPLE 12

Using a 96-stitch braiding machine, a cylindrical braided structure was prepared with 48 spindles of a 100-denier polyester monofilament clockwise arranged and 48 spindles of the same polyester monofilament counterclockwise arranged. Then, around the circular surface of this cylindrical braided structure was evenly wound a crimped yarn comprising a polyester multifilament of 0.5 denier in single yarn size (total denier 1400) at a winding tension of 1.5 g to yield a multiple layer flexible tubular filtering material of 3.8 mm in inside diameter wherein the fabric weight of the fiber assembly layer was 100 g/m$^2$.

A total of 7 cords of the multiple layer flexible tubular filtering material thus obtained were cut into 300 mm pieces (L/D=79). One opening end was closed with epoxy resin, and the other end bundled and fixed with epoxy resin adhesive to yield a filter, which was then inserted into a silicon rubber casing of 18 mm in diameter to yield a filter element.

Then, this filter element was subjected to a light oil filtering test in accordance with the testing method specified in JIS-D-1617 to determine the degree of cleanliness and service life. A degree of cleanliness of 84 mg/l and service life of 27 minutes were obtained.

EXAMPLE 13

Using a 48-stitch braiding machine, a cylindrical braided structure was prepared with 16 spindles of a 200-denier polyester monofilament clockwise arranged and 16 spindles of the same polyester monofilament counterclockwise arranged. Then, around the circular surface of this cylindrical braided structure was evenly wound a crimped yarn comprising a polyester multifilament of 1.0 denier in single yarn size (total denier 1400) at a winding tension of 1.5 g to yield a multiple layer flexible tubular filtering material of 2.5 mm in inside diameter wherein the fabric weight of the fiber assembly layer was 300 g/m$^2$.

A total of 7 cords of the multiple layer flexible tubular filtering material thus obtained were cut into 300 mm pieces (L/D=120). One opening end was closed with epoxy resin, and the other end bundled and fixed with epoxy resin adhesive to yield a filter, which was then inserted into a silicon rubber casing of 18 mm in diameter to yield a filter element.

Then, this filter element was subjected to a light oil filtering test in accordance with the testing method specified in JIS-D-1617 to determine the degree of cleanliness and service life. A degree of cleanliness of 75 mg/l and service life of 30 minutes were obtained.

Industrial Applicability

The present invention provides a flexible tubular filtering material which is capable of efficiently removing particles present in liquids such as water, oil and fuel and which is free of bending obstruction, and a flexible filtering material wherein said filtering material is housed in a flexible casing, and is used as an ordinary liquid filter and particularly as an automobile fuel filter placed in a bent path.

BRIEF EXPLANATION OF THE DRAWINGS

FIG. 1 shows the state of bending the flexible tubular filtering material of the present invention at a curvature radius of R=50 mm in a flexible casing, in which:

1 is the flexible casing,
2 is the flexible tubular filtering material,
3 is the inlet for the subject fluid,
4 is the portion at which the filtering material is fixed onto the casing,
5 is the outlet for the subject liquid, and
6 is the filtering material end sealed portion.

FIGS. 2 and 3 show textured yarns comprising a low density packing layer and a high density packing layer, in which:

1 is short fiber,
2 is the high density packing layer, and
3 is the low density packing layer.

We claim:

1. A flexible tubular filtering material having an upstream side and a downstream side comprising a braided cord structure wherein a number of yarns are braided into a cylindrical form while being spirally wound in both the right direction for some yarns and left direction for other yarns and also along the longitudinal direction with the yarns intercrossed with each other, said tubular filtering material being flexible and capable of remaining free of obstruction after being bent, and said tubular filtering material being capable of removing at least about 90 percent of particles, having a median diameter of 6.6 to 8.6 $\mu$m, in a 0.5 g/l suspension, when said suspension is passed through the filtering material at a flow rate of 2 l/min, wherein the inside diameter of the flexible tubular filtering material is 1 to 10 mm, and L/D, the ratio of length to inside diameter, is 10 to 500.

2. A flexible tubular filtering material having an upstream side and a downstream side comprising a braided cord structure wherein a number of yarns are braided into a cylindrical form while being spirally wound in both the right direction for some yarns and left direction for other yarns and also along the longitudinal direction with the yarns intercrossed with each other, said tubular filtering material being flexible and capable of remaining free of obstruction after being bent, and said tubular filtering material being capable of removing at least about 90 percent of particles, having a median diameter of 6.6 to 8.6 $\mu$m, in a 0.5 g/l suspension, when said suspension is passed through the filtering material at a flow rate of 2 l/min, wherein every yarn constituting the tubular filtering material is a 100- to 500-denier monofilament.

3. A flexible tubular filtering material having an upstream side and a downstream side comprising a braided cord structure wherein a number of yarns are braided into a cylindrical form while being spirally wound in both the right direction for some yarns and left direction for other yarns and also along the longitudinal direction with the yarns intercrossed with each other, said tubular filtering material being flexible and capable of remaining free of obstruction after being bent, and said tubular filtering material being capable of removing at least about 90 percent of particles, having a median diameter of 6.6 to 8.6 $\mu$m, in a 0.5 g/l suspension, when said suspension is passed through the filtering material at a flow rate of 2 l/min, wherein more than 2 kinds of yarns constitute the tubular filtering material and one of the yarns is a 100- to 500-denier monofilament.

4. A multiple layer flexible tubular filtering material comprising (1) a flexible tubular filtering material having an upstream side and a downstream side comprising a braided cord structure wherein a number of yarns are braided into a cylindrical form while being spirally wound in both the right direction for some yarns and left direction for other yarns and also along with the longitudinal direction with the yarns intercrossed with each other, said tubular filtering material being flexible and capable of remaining free of obstruction after being bent and (2) a fiber assembly layer comprised of one or more elements selected from the group consisting of braids, fabrics, knits, nonwoven fabric tapes, yarn bundles, and silver and filament bundles, wherein said fiber assembly layer is installed around the cylindrical periphery of the tubular filtering material.

5. A flexible tubular filtering material having an upstream side and a downstream side comprising a braided cord structure wherein a number of yarns are braided into a cylindrical form while being spirally wound in both the right direction for some yarns and left direction for other yarns and also along with the longitudinal direction with the yarns intercrossed with each other, said tubular filtering material being flexible and capable of remaining free of obstruction after being bent, wherein the packing density on the upstream side thereof ranges from about 0.01 to 0.2 cc/cc and is lower than the packing density on the downstream side thereof which ranges from about 0.1 to 0.4 cc/cc.

6. A flexible filter element comprising a flexible tubular filtering material having an upstream side and a downstream side comprising a braided cord structure wherein a number of yarns are braided into a cylindrical form while being spirally wound in both the right direction for some yarns and left direction for other yarns and also along with the longitudinal direction with the yarns intercrossed with each other, said tubular filtering material being flexible and capable of remaining free of obstruction after being bent; and a flexible casing having an inlet and an outlet, wherein the upstream side of the filtering material is fixed at the inlet of the casing and the downstream side of the filtering material is sealed at the outlet of a casing.

7. A flexible filter element comprising a multiple layer flexible tubular filtering material comprising a flexible tubular filtering material having an upstream side and a downstream side comprising a braided cord structure wherein a number of yarns are braided into a cylindrical form while being spirally wound in both the right direction for some yarns and left direction for other yarns and also along with the longitudinal direction with the yarns intercrossed with each other, said tubular filtering material being flexible and capable of remaining free of obstruction after being bent, wherein a fiber assembly layer comprised of one or more elements selected from the group consisting of braids, fabrics, knits, nonwoven fabric tapes, yarn bundles, and sliver and filament bundles is installed around the cylindrical periphery of the tubular filtering material and a flexible casing having an inlet and an outlet, wherein the upstream side of the filtering material is fixed at the inlet of the casing and the downstream side of the filtering material is sealed at the outlet of the casing.

8. The flexible filter element of claim 7 wherein the flexible tubular filtering material has an inside diameter from 1 to 10 mm, and an L/D ratio of length to inside diameter from 10 to 500.

* * * * *